Patented Feb. 2, 1932

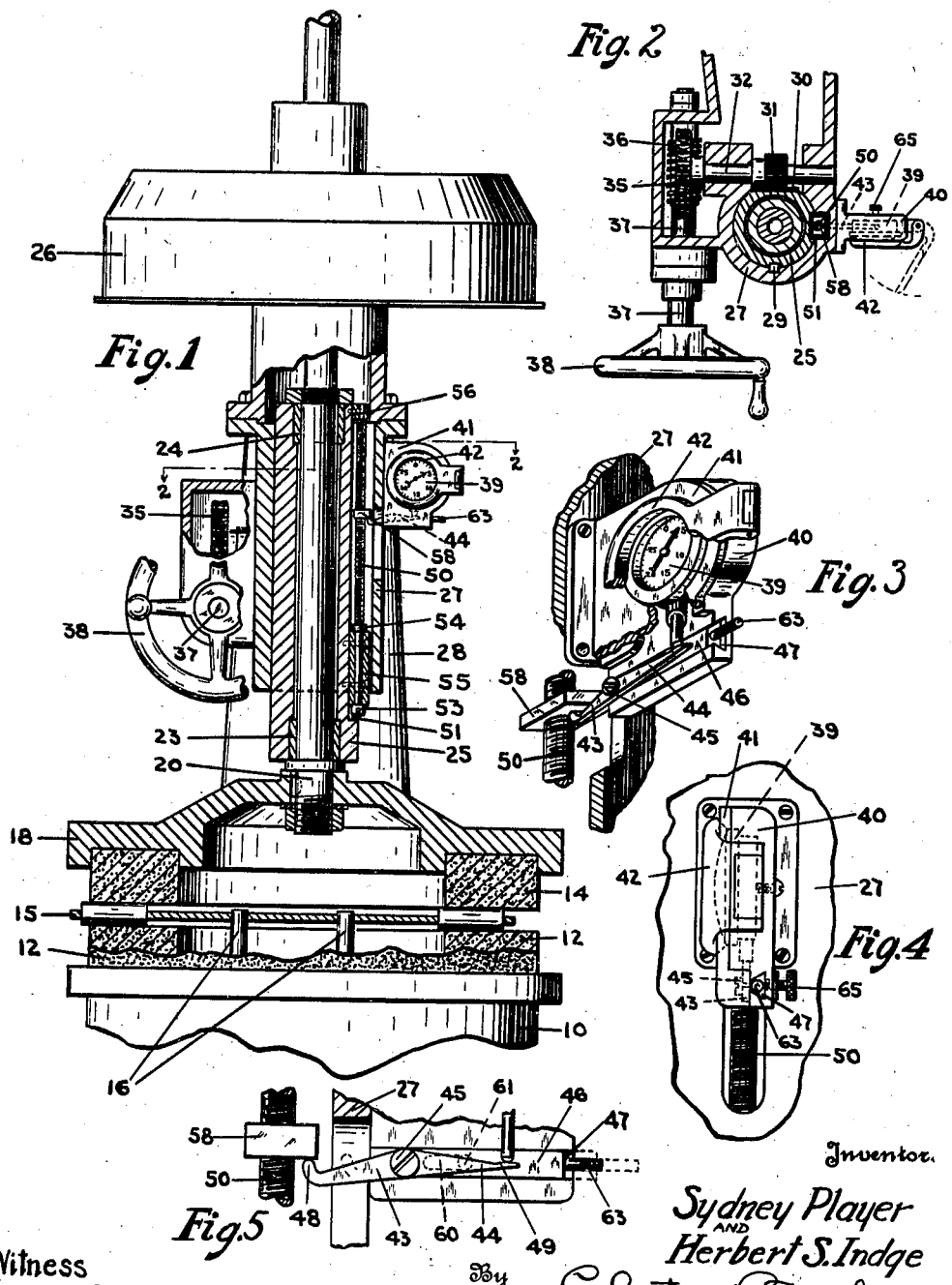

1,843,300

UNITED STATES PATENT OFFICE

SYDNEY PLAYER AND HERBERT S. INDGE, OF WESTBORO, MASSACHUSETTS, ASSIGNORS TO NORTON COMPANY, OF WORCESTER, MASSACHUSETTS, A CORPORATION OF MASSACHUSETTS

LAPPING MACHINE

Application filed March 25, 1929. Serial No. 349,792.

This invention relates to lapping machines and more particularly to machines arranged to lap a multiplicity of duplicate pieces simultaneously.

In lapping machines of the type adapted for lapping a large number of pieces of work, it is especially desirable that these work pieces be lapped until they are duplicate in size and have a desired thickness. In order to gauge the work pieces in this type of lapping machine, it is customary for the operator to move the upper lap a considerable distance away from the lower one, remove work pieces from the work cage and separately gauge these with a hand gauge. This operation involves considerable waste of valuable time which should be utilized in producing the lapped articles.

It is therefore one object of this invention to provide a practicable lapping machine whereby either the size of the work pieces or their decrease in size may be directly indicated during the lapping operation.

A further object is to provide a lapping machine having a work gauging device which is controlled by the movement of one of the laps for finely indicating the decreasing thickness of the work pieces during the lapping operation and which may be adjusted to indicate from a predetermined but variable point the linear movement of the movable lap toward the work.

With these and other objects in view as will be apparent to one skilled in the art, this invention resides in the combination of parts set forth in the specification and covered by the claims appended hereto.

Referring to the drawings which illustrate one embodiment of this invention, and in which like reference numerals indicate like parts:

Fig. 1 is a vertical front elevation partly in section of a simplified form of lapping machine embodying this invention, the laps being in the lapping position and having parts broken away to more clearly show the construction;

Fig. 2 is a plan view in section along the line 2—2 of Fig. 1 showing the work gauging device and the lap controlling mechanism;

Fig. 3 is an enlarged diagrammatic view of the work gauging device with parts broken away to show the mechanism associated therewith;

Fig. 4 is an enlarged end view of the work gauging device; and

Fig. 5 is an enlarged fragmentary view of the gauge mechanism showing details of construction.

A lapping machine of this type comprises two opposed laps and a work cage therebetween which are relatively movable to lap the pieces of work held within the cage, and may be constructed as shown in the patents to Indge No. 1,610,527 and Fraser No. 1,656,820. The laps are preferably arranged with their operative surfaces in horizontal planes and with one lap, and preferably the upper one, adapted to move vertically toward the other lap, such movement being effected by the action of gravity or by suitable mechanism. The main feature of this invention contemplates the provision of a mechanism which effectively and progressively indicates the size of the work pieces or the amount of material which has been removed during the lapping operation. For this purpose, a work gauging device is provided which may be operated in timed relation with the movement of the movable lap so that the decrease in work size is indicated as the laps relatively approach each other. It is preferred that the indicating device be so arranged that the movable lap may move to a predetermined position and then contact with the indicating device, which will thereafter indicate further movement of the lap toward the work piece. The embodiment of this invention illustrated has the upper lap mounted on a slide for vertical and preferably rotatable movement, and a contact member movable with the upper lap adjustable relative thereto is arranged to contact when desired with an operating member of a work gauging device carried on the outside of the machine.

As illustrated, a lapping machine for cylindrical work may comprise a suitably shaped base 10 on which is mounted a lower lap 12 and an upper lap 14, between which is arranged a work supporting cage 15. This machine may include various constructional features as shown in said patent to Indge, but insofar as the present invention is concerned, either lap may be stationary or rotatable and the work cage 15 movable or stationary, provided there is a relative movement between the laps and the cage to cause abrasion of the work. As illustrated, the upper lap is rotatable and the work cage 15 is mounted for revolution relative to the laps by means of the revolving posts 16 provided for that purpose and arranged as shown in the patent to Indge.

The upper lap 14 may comprise an abrasive disk cemented in a holder 18 suitably mounted on the lower end of the vertical shaft 20 for rotation in the two bearings 23 and 24 which are suitably constructed and mounted in a non-rotatable sleeve member 25. A pulley 26 is fastened to the upper end of the shaft and is arranged to be driven from any suitable source of power. The sleeve 25 is slidably mounted for vertical movement in the housing 27 which projects laterally from the vertical post 28 attached to the machine base 10, as shown in Fig. 1, and it is prevented from turning therein by means of a key 29.

To permit vertical movement of the upper lap, the sleeve 25 is provided upon one side with teeth 30 which mesh with a pinion 31 (Fig. 2) suitably fastened on a short shaft 32 journaled in the housing 27. A worm wheel 35 fastened on this shaft meshes with a worm 36 which is suitably keyed to a cross shaft 37 journaled in the housing 27, as shown in Figs. 1 and 2. The worm 36 may be rotated in either direction by a hand wheel 38, in order that the sleeve 25 and the upper lap carried thereby may be moved vertically toward or away from the lower lap.

In order that the extent of movement of the upper lap may be automatically indicated, a size indicating mechanism is provided which comprises a dial indicator 39 mounted on the housing 27 and adapted to be operated in timed relation with and preferably by movement of the movable lap toward the other lap during the lapping process. The dial indicator may be of the usual type, having a graduated face which is movable and an indicating element actuated by a reciprocable plunger held in frictional contact with an operating member. In the preferred construction, as illustrated in Figs. 3 and 4, the indicator is suitably fastened inside of a hollowed support 40, one side of which is correspondingly shaped to fit the indicator body and the opposite side arranged to be suitably supported to the housing 27. A cover 41 is provided with a suitable aperture for the movable indicator face and is shaped to fit the front of the indicator support 40 to completely enclose the mechanism. A protecting ring 42 is placed over the front of the indicator face and is suitably hinged to the side of the support 40 so that it may swing to the opened position, as shown in dotted outline in Fig. 2, in order that the indicator face may be easily accessible for adjustment. To operate the indicator, an actuating lever or operating member composed of arms 43 and 44 is pivotally mounted upon a pivot pin 45 carried by a transversely movable carrier slide 46 having beveled side faces which fit a correspondingly shaped dovetailed slideway 47 cut into the support 41. The lever arm 43 projects through a suitable opening in the housing 27 and is provided with a raised end-portion 48 which is adapted to be moved by means of a movable contact member adjustably mounted on the sleeve 25 supporting the upper lap. The arm 44 is terminated by a curved contacting surface 49 which frictionally contacts with the spring pressed plunger of the dial indicator.

The contacting mechanism, as shown in Figs. 1 and 3, includes a screw 50 which is located within a rectangular recess 51 formed by a groove in the side of the sleeve 25 and an opposed groove in the housing 27. The lower end of this screw 50 has collars 53 and 54 which position the screw relative to the blocks 55 and 56 suitably attached to the sleeve, and in which the screw is rotatably mounted. The collar 53 is placed in a readily accessible position below and outside of the housing 27 and it is provided with a series of holes for the insertion of a pin for the purpose of rotating the screw 50 in order to move and adjust the contact nut 58 mounted thereon vertically up or down the screw to the desired initial position. The contact nut 58 is shaped to fit within the walls of the recess 51 as shown in Fig. 2 to prevent it from turning in the recess during its travel along the screw. During the normal lapping operation, the contact nut 58 and the lever arm 43 are in frictional engagement with each other so that any movement of the sleeve 25 toward the other lap will produce a corresponding movement of the dial indicator thereby recording on its dial the extent of movement of the upper lap from the initial position as determined by the adustment of the contact member.

If it is desired to operate the machine as an ordinary lapping machine without using the indicator, the connections between the indicator and the upper lap may be released by sliding the arm 43 out of the path of travel of the contact nut 58. To accomplish this, the slide 46 is provided with an elongated slot 60 within which passes a cylindrical stop pin 61 fixed in the support 41 and arranged to limit the extent of transverse movement of the slide 46 as it is moved in each direction, as shown in Fig. 5. A pin 63 is attached to the slide for the purpose of moving it to either of these positions. The slide 46 may be locked in the slideway 47 by means of a screw 65 suitably positioned in the rear wall of the support 40 and adapted to press against the slide 46 so as to wedge it tightly in the slideway.

The operation of the indicating device will be apparent from the preceding disclosure. Before the lapping process is commenced and with the laps stationary the operator turns the hand wheel 38 until the upper lap 14 contacts with the surface of the work pieces. As these work pieces consist of blanks which are not uniform in size, the lap 14 will initially contact with the large pieces only and after a short period of lapping will contact with the remainder. While the laps are in this position, the operator, by means of a pin inserted in one of the holes in the collar 53, rotates the screw 50 through the desired amount to move the contact nut 58 into engagement with the raised portion 48 of the lever arm 43. When this has been done the laps and cage are relatively rotated with respect to each other to lap the work. The sleeve 25 supporting the upper lap and carrying the contact mechanism including the screw 50 and the contact nut 58 moves downwardly as the work is reduced in size. During the downward movement of the sleeve 25 the contact nut 58, which is in contact with the lever 43, moves the actuating lever about the pivot screw 45 so that the indicator end of the lever arm 44, which is in frictional contact with the indicator plunger, moves upwardly to depress the indicator plunger a correspondingly proportionate amount to record the degree of movement on the dial face of the indicator. When the dial readings indicate that the work pieces are lapped to the proper size, the lap 14 is removed from engagement with the work pieces by means of the hand wheel 38 which is connected to the elevating mechanism of the sleeve 25.

Having thus described the invention, what is claimed as new and desired to secure by Letters Patent is:

1. A lapping machine comprising two opposed laps and a work cage therebetween which are relatively movable to lap the work, a vertically movable support for one of the laps, a contact member adjustably connected with the movable lap, a gauge having an operating member normally in the path of the contact member, and means for withdrawing one of said members from a contacting position whereby the lap may be freely moved without affecting the gauge.

2. A lapping machine comprising two opposed laps, one of which is movable towards and from the other, and a work cage therebetween which are relatively movable to lap the work, a fixed support mounted on the machine, a gauge carried by said support, a movable contact member carried by said movable lap, and means including an operating member in the path of the contact member which is operatively connected to move said gauge, and means for holding said operating member in or out of the path of the contact member.

3. A lapping machine comprising two opposed laps, one above the other, and a work cage which are relatively movable to lap the work, a housing, a vertically movable sleeve in said housing for the upper lap permitting it to be rotated and to be moved vertically, means to rotate the upper lap, a work gauging device mounted on the housing, a movable contact member mounted on said sleeve and adjustable relative thereto to actuate said gauge, means mounted on said sleeve and outside of said housing for adjusting said contact member, and means projecting within the housing and operatively connecting said gauge with the contact member whereby said gauge will indicate the extent of movement of the upper lap from any one of several predetermined positions.

4. A lapping machine comprising two opposed laps, one of which is movable toward and from the other, and a work cage which are relatively movable to lap the work, a support fixed to the machine, a gauge carried by said support, a transversely slidable bar mounted on said support, an oscillatable operating member for said gauge in operative engagement therewith and pivotally mounted on said bar, a rotatable screw carried by the upper lap, and a contact member adjustably mounted on said screw to contact with said operating member in any one of several predetermined positions.

5. A lapping machine comprising two opposed laps, one of which is movable toward and from the other, and a work cage which are relatively movable to lap the work, a fixed support, a carrier slidable transversely thereon, a gauge carried by said support, a contact member carried by said movable lap, an operating member for said gauge carried by said carrier, and adapted to be moved by said contact member, a stop on said support, and means on said carrier which cooperate with said stop to limit the extent of transverse movement of said carrier in each direction.

6. A lapping machine comprising two opposed laps, a work cage therebetween, means for rotating the upper lap, a housing, a non-rotatable sleeve which supports the rotatable lap and is slidably mounted within the housing for vertical movement toward and from the lower lap, means to move said sleeve and upper lap toward and from the other lap, a contact member movable with the sleeve, a gauge on the housing having an operating member projecting within said housing into the path of the contact member, and readily accessible means to adjust the contact member relative to the sleeve.

7. A lapping machine comprising two opposed laps and a work cage therebetween which are relatively movable to lap the work, a rotatable spindle supporting the upper lap, a housing, a vertically slidable sleeve within the housing and carrying said spindle, means for rotating said spindle in said sleeve, a gauge mounted on the machine, a contact member, means including an accessible screw rotatably mounted in the sleeve to adjust the contact member vertically, and connections between the gauge and the contact member actuated by movement of said sleeve to continuously indicate the decrease in size of the work pieces at all times during the lapping operation.

Signed at Worcester, Massachusetts, this 21st day of March 1929.

SYDNEY PLAYER.
HERBERT S. INDGE.